United States Patent Office 2,943,314
Patented June 28, 1960

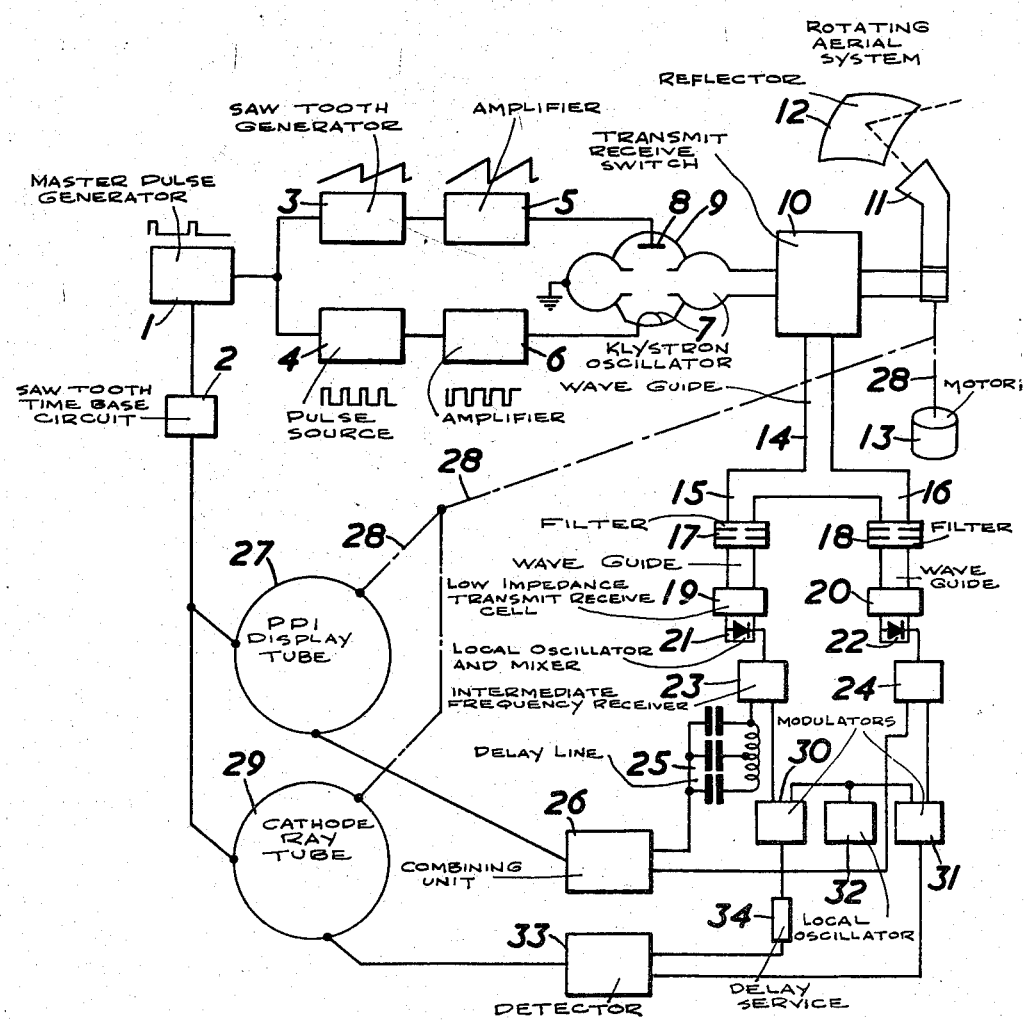

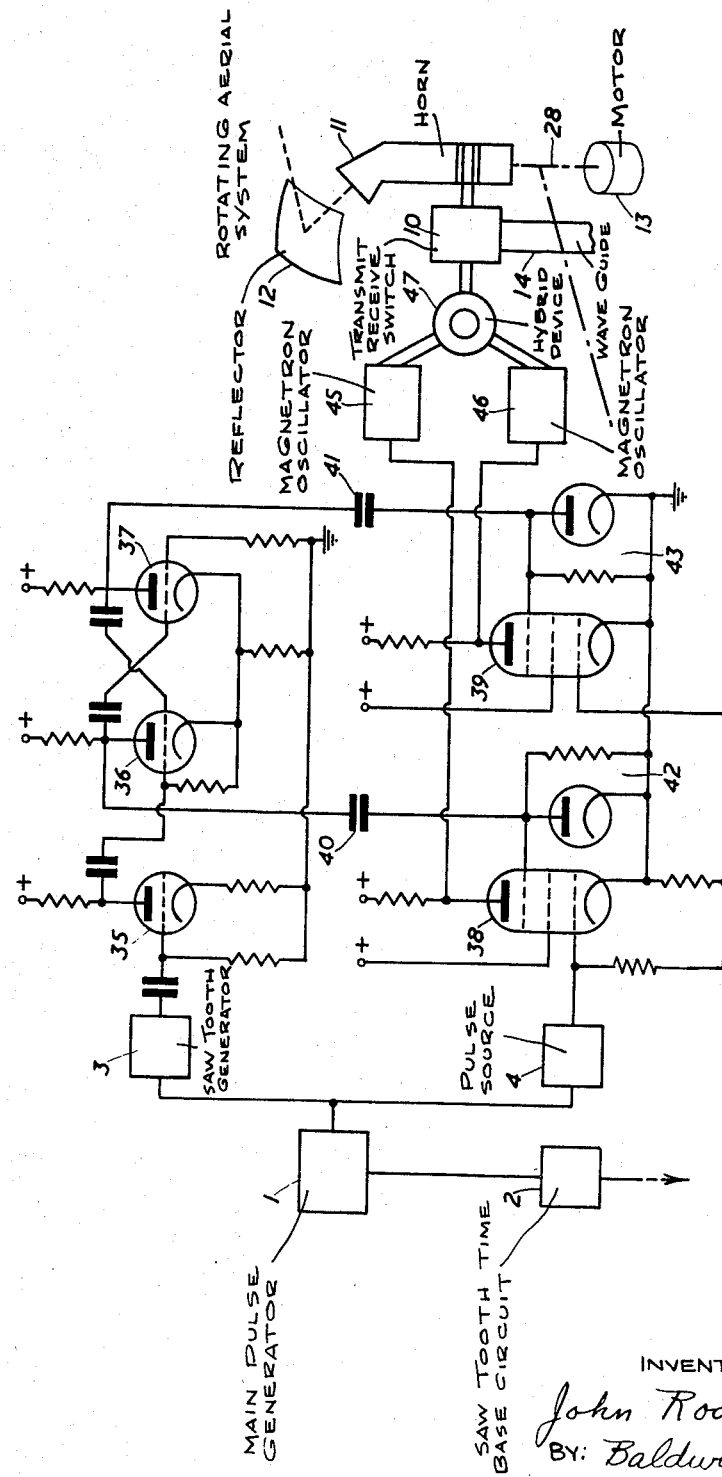

2,943,314

PULSED RADAR SYSTEMS

John Rodgers, Shenfield, England, assignor to Marconi's Wireless Telegraph Company Limited, London, England, a British company Filed Jan. 24, 1956, Ser. No. 561,110

Claims priority, application Great Britain Jan. 26, 1955

5 Claims. (Cl. 343—7.7)

This invention relates to pulsed radar systems.

In a conventional pulsed radar system employing a rotating directional beam for searching and the usual plan position indicating (P.P.I.) type of display, the rate at which target information can be obtained and displayed is limited by the fact that in order to obtain reliable indication of the presence of a target it must be struck by a minimum number of pulses as the radar beam sweeps across it. In practice, the minimum number of pulses must be of the order of 4 to 6 if the radar system is a normal one and the target is an aircraft for example. With so-called moving target indicator (M.T.I.) systems (in which the display of a stationary target is prevented by delaying the earlier of two successive received echo pulses by the pulse interval between the corresponding transmitted pulses and then combining said echo pulses in opposition so that, in the case of a stationary target they cancel one another) it is necessary to illuminate a target with some 10 to 20 pulses in order to secure reliable cancellation of stationary targets. Also of recent years it has become necessary practice to make the directionally transmitted beam sharp, with a horizontal beam width of the order of only about ½° to 1° in order to achieve good discrimination and high aerial gain. The foregoing considerations, combined with the fact that if a confused display is to be avoided, echo signals due to any pulse must be received before the next pulse is transmitted, limit the maximum pulse repetition frequency which can be used to the order of 250 to 300 pulses per second in a radar system with a maximum range of the order of 200 miles. Accordingly, in order to obtain a sufficient number of pulses on the target, the rate of revolution in azimuth of the aerial must be shown—only about 4 to 6 revolutions per minute—and this means that data from a given target is obtained only once in every 10 to 15 seconds, during which time a modern aircraft or missile can move several miles.

The object of the present invention is to provide improved radar systems which will enable the rate at which data can be obtained from a given target to be increased as compared to comparable known systems. From the foregoing it will be apparent that the invention, though not limited to its application thereto, is of considerable advantage when applied to M.T.I. radar systems since, in such systems, it is particularly important to be able to increase the speed of search, i.e. the speed of aerial rotation for a given width of beam and given maximum range, though, of course, it is also important to be able to do this in other radar systems.

According to this invention a pulsed radar system comprises means for transmitting one sequence of pulses of waves of one predetermined frequency at one predetermined pulse repetition frequency, means for transmitting at least one additional sequence of pulses of waves of another predetermined frequency at the same pulse repetition frequency, the pulses of said additional sequence occurring in the intervals between the pulses of said one frequency with a predetermined time interval between the transmission of each pulse of said one sequence and each pulse of said additional sequence, means for receiving reflected echo pulses of both sequences, frequency sensitive means for separating the echo pulses of said additional sequence from those of said one sequence, means for delaying the separated echo pulses of said one sequence relative to the echo pulses of said additional sequence by a time delay substantially equal to said predetermined time interval, and means for utilizing the delayed echo pulses of said one sequence and the echo pulses of said additional sequence for target indication.

There may be one or several additional sequences of pulses. Irrespective of the number of sequences, the pulses are spaced in time so that each successive pulse in a transmitted series of number equal to the number of sequences will be appropriate to a different sequence, i.e. of a different frequency.

As already stated, the invention is applicable to pulsed radar systems whether of the M.T.I. type or not. When applied to an M.T.I. system, successive echo pulses each of a different sequence are combined in opposition after one of them has been delayed by a time interval equal to the transmission time interval between them, the combining being effected in a phase sensitive detector so that a stationary target will provide zero detector output, whereas, if the pulses are from a moving target, the combined pulses will not be exactly in phase opposition and there will accordingly be a detector output.

The invention is illustrated in the accompanying drawings which show in simplified diagrammatic form, two embodiments thereof in which:

Fig. 1 diagrammatically shows one application of my invention, employing a klystron; and Fig. 2 shows an application of my invention employing a magnetron.

Both embodiments of my invention include equipment for a normal full P.P.I. display, and also for a P.P.I. display of the M.T.I. type, i.e. one from which stationary targets are eliminated. It is, of course, not necessary to have both these forms of display simultaneously in the one equipment, but the showing of apparatus with both simplifies and shortens the description in this specification. Also again for the sake of simplicity of description the systems illustrated and hereinafter described have each only one additional sequence of pulses. As already explained, however, there may be several additional sequences. In the discussion which follows, practical values will be given but it is to be noted that they are purely exemplary.

Referring to Fig. 1 of the drawings, 1 is a master pulse generator producing a pulse frequency of, for example, 250 c./s. This generator drives a saw-tooth time base circuit 2 of known form and of the same frequency and also drives two waveform generating circuits 3 and 4 of any convenient known type. The circuit 3 is a saw-tooth waveform generator producing saw-tooth waves of 250 c./s. and the circuit 4 is a pulse source producing pulses of twice the frequency of those from the source 1, i.e. of 500 c./s. The outputs from the circuits 3 and 4 are suitably amplified in amplifiers 5 and 6 respectively, the latter of which is arranged to provide an output of negative going pulses. The negative pulses from amplifier 6 are applied to the cathode 7 and the saw-tooth waves from the amplifier 5 are applied to the reflector electrode 8 of a radio frequency klystron oscillator diagrammatically represented at 9. The resultant radio frequency pulses from the klystron 9 after such amplification as may be required (for simplicity, however, no amplifier for this purpose is shown) are fed through a transmit-receive (T.R.) switch 10 to a rotating aerial system represented as including a radio horn 11 and an associated reflector 12 which are rotated together as a unit by means such as an electric motor 13. Any suitable known form of aerial system may be used but because, in the radar system now being described, successive pulses are of different frequencies, the aerial system should be such as to be as little as possible directionally sensitive to frequency and the type of aerial system illustrated is reasonably insensitive in this respect over a frequency range sufficient for the purposes of the present invention.

The radio frequency of the output from a klystron is, of course, dependent on its reflector voltage. With the arrangement illustrated the klystron will produce a radio frequency pulse in response to each negative-going pulse from the amplifier 6 and the radio frequency will be the same for alternate pulses but different for successive pulses, since the saw-tooth voltage from the amplifier 5 and applied to the reflector will be different for successive pulses. Each pulse of one frequency will, with this arrangement, occur midway between two successive pulses of the other frequency, though this is not a necessary arrangement, and it is possible to arrange for the pulses of one sequence to be symmetrically positioned in time between the successive pulses of the other sequences. To give non-limiting practical figures, a frequency spacing of the order of tens of mc./s. might be used in the case of microwave transmissions with a pulse length of the order of a few micro-seconds. The two spaced frequencies will hereinafter be referred to as $f_1$ and $f_2$.

Received echoes are picked up by the same aerial system and passed out from the T.R. cell 10 to a waveguide 14 which is branched into two guides 15 and 16. In each of these guides is a frequency selective filter 17 or 18, diagrammatically represented as of the well known iris type. The filter 17 selects frequency $f_1$ and the filter frequency 18, $f_2$. Each of these filters is followed by a low level T.R. cell 19 or 20 which feeds into a local oscillator and crystal mixer output device schematically represented by the block 21 or 22. Each of the blocks 21 and 22 thus incorporates a local oscillator (not separately shown) and thence local oscillators are frequency stabilized and frequency locked in manner known per se so as to be of different frequencies such as will provide, in the outputs from the units 21 and 22, the same intermediate frequency. In other words the difference between the frequencies of the local oscillators incorporated in units 21 and 22 is made the same as the difference between the radio frequencies $f_1$ and $f_2$.

The crystals 21 or 22 feed their intermediate frequency outputs respectively into intermediate frequency receivers 23 or 24. Receivers 23 and 24 each incorporate a simple detector and a phase sensitive detector of any convenient well known type.

The output of the simple detector of the receiver 23 feeds through a delay line 25 into a signal combining unit 26 of any convenient well known form, and the output of the simple detector of receiver 24 feeds directly into the said combining circuit. The delay of the delay line 25 is normally made equal to a few milliseconds, i.e. to the time interval between the transmission of a pulse of frequency $f_1$ and the transmission of the next pulse of frequency $f_2$. The combined output from circuit 26 is fed as "brighten-up" voltage to a cathode ray P.P.I. type display tube represented purely diagrammatically at 27, and which is subject to radial reflection from the time base 2, and to circular deflection in synchronization with the aerial system 11 and 12. Since means for securing such radial and synchronized circular deflection are in accordance with well known practice, the representation in the figure is made purely diagrammatically. The necessary link between the rotating aerial system and the circular deflection in the tube 27 and which in practice would normally be provided by a Selsyn or like system is represented merely schematically in the figure by chain lines 28.

As so far described the system provides a normal full P.P.I. type of display showing both fixed and moving targets. The illustrated embodiment, however, also includes a P.P.I. display of the M.T.I. type, i.e. one from which fixed targets are eliminated. This is given by a second cathode ray tube 29, subject to radial and circular deflection in exactly the same way as the tube 27. To operate the tube 29 the outputs from the two phase sensitive detectors of receivers 23, 24 are fed to modulators 30 and 31 respectively, whose second inputs are derived from a local oscillator 32. The outputs of the modulators 30 and 31, which will accordingly be amplitude modulated signals of a suitable frequency are fed to a detector 33, the input thereto from the modulator 31 being directly fed to the detector while that from a modulator 30 is fed thereto through a delay device 34 providing a delay of 2 milliseconds. This delay device 34 is preferably of the well known mercury tube or similar supersonic pressure wave type. The output from the detector 33 is fed as "brighten-up" input to the tube 29. The tube 29 will accordingly not display fixed targets but will display moving targets, their being so-called M.T.I. cancellation.

It will be noted that, owing to the operation of the T.R. cells, any echo pulse of one sequence which happens to be received when the next pulse of the other sequence is being transmitted, will be effectively lost. As, however, the pulses are short and the invention is of most importance when applied to long range radars, such effective loss of received signals is not of serious importance—not, indeed, of sufficient importance to warrant the provision of special means to avoid it.

The embodiment partly shown in Fig. 2 is suitable for cases in which the means used for generating the radio frequency energy are such as do not lend themselves to variation of frequency as does a klystron. Thus, for example, a magnetron oscillator could not be satisfactorily substituted for the klystron oscillator 9 of Fig. 1 since a magnetron oscillator is essentially a fixed frequency device. If magnetrons or other fixed frequency radio frequency sources are required to be used the most convenient arrangement is to provide a plurality (one for each sequence) and bring them into use in turn in the required manner. Fig. 2 shows one arrangement of this nature so far as is necessary to an understanding thereof. Like references designate like parts in Figs. 1 and 2.

In the arrangement of Fig. 2 the saw tooth output from the wave form generator 3 is passed, after such amplification as may be required to a valve 35 which is well biassed back so as to become conductive only in response to the peaks of the saw teeth from generator 3. The resultant short pulses at saw-tooth frequency are fed as triggering pulses to a multivibrator of form well known per se and comprising valves 36 and 37 having their grids and anodes capacity cross-coupled as shown.

The pulse output from the pulse source 4 is fed in parallel to the control grids of two gated valves shown as pentodes 38, 39. These valves are gated by rectangular voltage wave forms applied to their suppressor grids and derived, in the case of valve 38, from the anode of valve 36 through condenser 40 and, in the case of valve 39, from the anode of valve 37 through condenser 41. As will be apparent, with this arrangement the valves 38 and 39 will become alternately conductive, one passing alternate pulses from the source 4 and the other passing the remaining alternate pulses. The diode-resistance combinations 42, 43 shown in the suppressor grid circuits of the valves 38, 39 respectively, provide so-called D.C. restoration.

The pulse sequences from the anodes of the valves 38, 39 are employed to control the operation of magnetron oscillators represented by the blocks 44 and 45 and tuned to operate at the frequencies $f_1$, $f_2$ respectively. One of these magnetrons accordingly provides one sequence of pulses of the one frequency ($f_1$) and the other provides the other sequence (the pulses of which alternate with these of the first) of the other frequency $f_2$. The outputs from the magnetrons are fed through a suitable known hybrid device 47, such as a so-called rat race, to the T.R. cell 10 and thence to the aerial-reflector combination 11—12. The remainder of the installation is as shown in Fig. 1.

Although, for the sake of simplicity in description, the illustrated cases are of embodiments in which there are only two sequences of pulses and only two transmitted radio frequencies, in practice it will usually be better to provide more sequences—for example 4 to 6 sequences, with a corresponding number of frequencies so that each of a succession of (say) six pulses will be at a different one of six frequencies.

I claim:

1. A pulsed radar system comprising means for transmitting one sequence of pulses of waves of one predetermined frequency at one predetermined pulse repetition frequency, means for transmitting at least one additional sequence of pulses of waves of another predetermined frequency at the same pulse repetition frequency, the pulses of said additional sequence occurring in the intervals between the pulses of said one frequency with a predetermined time interval between the transmission of each pulse of said one sequence and each pulse of said additional sequence, means for receiving reflected echo pulses of both sequences, frequency sensitive means for separating the echo pulses of said additional sequence from those of said one sequence, time delay means for providing a delay equal to the time interval between the transmission of said pulse sequences, means for applying the separated echo pulses of said one sequence to said delay means, means for transposing the separated echo pulses of different radio frequency to a common intermediate frequency, means for utilizing the pulses of common intermediate frequency for display, a saw tooth wave source of the same frequency as the frequency of said one sequence of pulses and controlled by said one sequence of pulses, a radio frequency oscillator adapted to provide transmitting pulses dependent upon a control voltage fed thereto, means controlled by said additional sequence of pulses for energizing said oscillator in pulses of radio frequency energy, and means for feeding the saw tooth waves from said saw tooth wave source as control voltage to said oscillator.

2. A pulsed radar system as set forth in claim 1 having moving target indication means comprising two modulator circuits, means for applying delayed pulses to one modulator circuit and undelayed signals to the other modulator circuit, a phase-sensitive detector, means for applying the delayed echo pulses from said one modulator to said detector through a further delay device, means for applying the undelayed pulses from said other modulator circuit to said detector in phase opposition to the delayed pulses applied thereto, and means for applying the output of said detector for moving target indication.

3. A pulsed radar system as set forth in claim 1 having moving target indication means comprising two modulator circuits, means for applying delayed pulses to one modulator circuit and undelayed signals to the other modulator circuit, a phase-sensitive detector, means for applying the delayed echo pulses from said one modulator to said detector through a further delay device, means for applying the undelayed pulses from said other modulator circuit to said detector in phase opposition to the delayed pulses applied thereto, frequency changing mixers having a common local oscillator input, separate receivers connected with said modulator circuits, said mixers each having a second input derived from the separate receivers, respectively, channels providing different time delays and fed from the different mixers, the difference between the time delay imposed by any two channels being equal to the time delay between the transmitted pulses corresponding to the pulses fed into said channels, said phase-sensitive detector being connected to compare the phases of the outputs of two different channels and adapted to produce zero output in response to the in-phase condition, and display means fed from the phase-sensitive detector.

4. A pulsed radar system as set forth in claim 3 wherein said oscillator is a variable frequency oscillator, the frequency of which is varied from one transmitting pulse to a succeeding transmitting pulse.

5. A pulsed radar system comprising means for transmitting one sequence of pulses of waves of one predetermined frequency at one predetermined pulse repetition frequency, means for transmitting at least one additional sequence of pulses of waves of another predetermined frequency at the same pulse repetition frequency, the pulses of said additional sequence occurring in the intervals between the pulses of said one frequency with a predetermined time interval between the transmission of each pulse of said one sequence and each pulse of said additional sequence, means for receiving reflected echo pulses of both sequences, frequency sensitive means for separating the echo pulses of said additional sequence from those of said one sequence, time delay means for providing a delay equal to the time interval between the transmission of said pulse sequences, means for applying the separated echo pulses of said one sequence to said delay means, means for transposing the separated echo pulses of different radio frequency to a common intermediate frequency, means for utilizing the pulses of common intermediate frequency for display, a saw tooth wave source of the same frequency as the frequency of said first mentioned sequence of pulses and controlled by said first mentioned sequence of pulses, a plurality of sources of radio frequency each of a different frequency, the number of said sources being the same as the number of sequences to be transmitted, and means controlled by said saw tooth wave source for passing successive pulses from said additional pulse source to different ones of said radio frequency sources to energize the same in succession.

References Cited in the file of this patent

UNITED STATES PATENTS

| | | |
|---|---|---|
| 2,522,367 | Guanella | Sept. 12, 1950 |
| 2,676,317 | Purington | Apr. 20, 1954 |
| 2,712,646 | Lawson | July 5, 1955 |
| 2,741,762 | Page | Apr. 10, 1956 |
| 2,817,832 | Mathes | Dec. 24, 1957 |

FOREIGN PATENTS

| | | |
|---|---|---|
| 638,278 | Great Britain | June 7, 1950 |